United States Patent
Le Maut et al.

(10) Patent No.: US 7,787,446 B2
(45) Date of Patent: *Aug. 31, 2010

(54) PACKET UNSTOPPER SYSTEM FOR A PARALLEL PACKET SWITCH

(75) Inventors: Francois Le Maut, Nice (FR); Rene Glaise, Nice (FR); Michel Poret, Gattieres (FR); Rene Gallezot, La Colle sur Loop (FR)

(73) Assignee: International Business Machines Corporation, Armonk, NY (US)

( * ) Notice: Subject to any disclaimer, the term of this patent is extended or adjusted under 35 U.S.C. 154(b) by 27 days.

This patent is subject to a terminal disclaimer.

(21) Appl. No.: 12/126,679

(22) Filed: May 23, 2008

(65) Prior Publication Data

US 2008/0225854 A1    Sep. 18, 2008

Related U.S. Application Data

(63) Continuation of application No. 10/723,503, filed on Nov. 26, 2003, now Pat. No. 7,391,766.

(30) Foreign Application Priority Data

Dec. 19, 2002    (EP) ................................. 02368138

(51) Int. Cl.
   *H04Q 11/00*    (2006.01)
(52) U.S. Cl. .................... 370/387; 370/388; 370/395.7; 370/416; 710/57; 710/241
(58) Field of Classification Search ................. 370/387, 370/398, 412, 416
   See application file for complete search history.

(56) References Cited

U.S. PATENT DOCUMENTS

| 6,212,582 | B1 * | 4/2001 | Chong et al. ................... 710/57 |
| 6,222,858 | B1 * | 4/2001 | Counterman ................. 370/474 |
| 6,856,622 | B1 * | 2/2005 | Calamvokis et al. ........ 370/390 |
| 7,046,687 | B1 * | 5/2006 | Brown et al. ................. 370/412 |
| 7,079,485 | B1 * | 7/2006 | Lau et al. ..................... 370/229 |
| 7,085,279 | B1 * | 8/2006 | Kumar et al. ................ 370/401 |
| 7,161,901 | B2 * | 1/2007 | Vu .............................. 370/229 |
| 7,263,097 | B1 * | 8/2007 | Ornes et al. .................. 370/386 |
| 7,292,580 | B2 * | 11/2007 | Ramamurthy et al. .. 370/395.42 |
| 7,391,766 | B2 * | 6/2008 | Le Maut et al. ............. 370/387 |
| 7,406,042 | B1 * | 7/2008 | Shridhar et al. ............. 370/230 |
| 7,466,697 | B1 * | 12/2008 | Raz et al. ..................... 370/389 |
| 7,512,780 | B1 * | 3/2009 | Milliken ..................... 713/153 |

* cited by examiner

*Primary Examiner*—Dang T Ton
*Assistant Examiner*—Brian O'Connor
(74) *Attorney, Agent, or Firm*—Joscelyn G Cockburn; Mark E. McBurney; Adam Steadman

(57) ABSTRACT

A system for controlling egress buffer saturation includes, for each data packet flow, a comparator for comparing the number of data packets 'WPC' temporarily stored within an egress buffer to a predefined threshold value 'WPCth'. The packet sequence number 'PSNr' of a last received in-sequence data packet and each highest packet sequence number 'HPSNj' received through respective ones of the plurality of switching planes is stored. By comparing the last received in-sequence packet sequence number 'PSNr' to each highest packet sequence number 'HPSNj' when the number of data packets 'WPC' exceeds the predefined threshold value 'WPCth' a determination as to which switching plane(s), among the plurality of switching planes, to unstop the flow of data packets can be made.

12 Claims, 6 Drawing Sheets

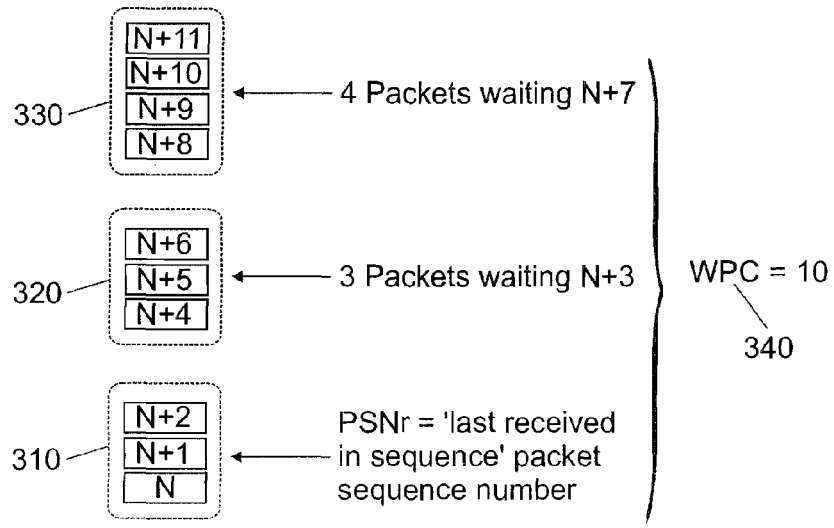

FIG. 3

| Source, Priority | WPC | PSNr | HPSN1 | HPSN2 | HPSN3 | HPSN4 | HPSN5 | HPSN6 |
|---|---|---|---|---|---|---|---|---|
| Source, Priority | WPC | PSNr | HPSN1 | HPSN2 | HPSN3 | HPSN4 | HPSN5 | HPSN6 |
| Source, Priority | WPC | PSNr | HPSN1 | HPSN2 | HPSN3 | HPSN4 | HPSN5 | HPSN6 |
| Source, Priority | WPC | PSNr | HPSN1 | HPSN2 | HPSN3 | HPSN4 | HPSN5 | HPSN6 |
| Source, Priority | WPC | PSNr | HPSN1 | HPSN2 | HPSN3 | HPSN4 | HPSN5 | HPSN6 |
| Source, Priority | WPC | PSNr | HPSN1 | HPSN2 | HPSN3 | HPSN4 | HPSN5 | HPSN6 |
| Source, Priority | WPC | PSNr | HPSN1 | HPSN2 | HPSN3 | HPSN4 | HPSN5 | HPSN6 |
| Source, Priority | WPC | PSNr | HPSN1 | HPSN2 | HPSN3 | HPSN4 | HPSN5 | HPSN6 |

PACKET UNSTOPPER SYSTEM FOR A PARALLEL PACKET SWITCH

CROSS REFERENCE TO RELATED PATENT APPLICATIONS

This Application claims priority from application Ser. No. 10/723,503, filed Nov. 26, 2003.

The present invention is related to the following patent applications which are incorporated herein by reference:

Ser. No. 10/723,834 entitled "CAM Based System and Method for Re-Sequencing Data Packets", filed Nov. 26, 2003;

Ser. No. 10/722,900 entitled "System and Method for Sequencing Data Packets on a Per-Flow Basis", filed Nov. 26, 2003;

Ser. No. 10/722,901 entitled "Method and System for Resequencing Data Packets Switched Through a Parallel Packet Switch", filed Nov. 26, 2003.

FIELD OF THE INVENTION

The present invention relates to high speed switching of data packets in general, and particularly relates to a system and method to control the saturation of egress buffers that store data packets switched through a plurality of independent switching planes of a parallel packet switch architecture.

BACKGROUND OF THE INVENTION

DWDM, which stands for Dense Wavelength Division Multiplexing, by merging onto a single optical fiber many wavelengths, is making available long-haul fiber-optic data communications links of huge aggregate capacity. Each wavelength is an independent communications channel which typically operates at OC48c i.e.: 2.5 Giga or $10^9$ bits per Second (Gbps), OC192c (10 Gbps) and in some systems at OC768c (40 Gbps). These rates are part of a family of rates and formats available for use in optical interfaces, generally referred to as SONET, which is a standard defined by the American National Standards Institute (ANSI) of which there exists an European counterpart, mostly compatible, known as SDH (Synchronous Digital Hierarchy). Thus, at each node of a network, the data packets or cells carried on each DWDM channel must be switched, or routed, by packet-switches that process and then switch packets between different channels so as to forward them towards their final destination. If, ideally, it would be desirable to keep the processing of packets in the optical domain, without conversion to electronic form, this is still not really feasible today mainly because all packet-switches need buffering that is not yet available in an optical form. So packet-switches will continue to use electronic switching technology and buffer memories for some time to come.

However, because of the data rates as quoted above for individual DWDM channels (up to 40 Gbps) and the possibility of merging tenths, if not hundredths, of such channels onto a single fiber the throughput to handle at each network node can become enormous i.e., in a multi Tera or $10^{12}$ bits per second range (Tbps) making buffering and switching, in the electronic domain, an extremely challenging task. If constant significant progress has been sustained, for decades, in the integration of always more logic gates and memory bits on a single ASIC (Application Specific Integrated Circuit), allowing to implement the complex functions required to handle the data packets flowing into a node according to QoS (Quality of Service) rules unfortunately, the progress in speed and performance of the logic devices over time is comparatively slow, and now gated by the power one can afford to dissipate in a module to achieve it. Especially, the time to perform a random access into an affordable memory e.g., an imbedded RAM (Random Access Memory) in a standard CMOS (Complementary MOS) ASIC, is decreasing only slowly with time while switch ports need to interface channels having their speed quadrupling at each new generation i.e., from OC48c to OC192c and to OC768c respectively from 2.5 to 10 and 40 Gbps. For example, if a memory is 512-bit wide allowing to store or fetch, in a single write or read operation, a typical fixed-size 64-byte (8-bit byte) packet of the kind handled by a switch, this must be achieved in less than 10 Nano or $10^{-9}$ second (Ns) for a 40 Gbps channel and in practice in a few Ns only in order to take care of the necessary speed overhead needed to sustain the specified nominal channel performance while at least one store and one fetch i.e., two operations, are always necessary per packet movement. This represents, nowadays, the upper limit at which memories and CMOS technology can be cycled making the design of multi Tbps-class switch extremely difficult with a cost-performance state-of-the-art technology such as CMOS, since it can only be operated at a speed comparable to the data rate of the channel they have to process.

Hence, to design and implement a high capacity packet-switch (i.e.: having a multi Tbps aggregate throughput) from/ to OC768c (40 Gps) ports a practical architecture, often considered to overcome the above mentioned technology limitation, is a parallel packet switch (PPS) architecture. It is comprised of multiple identical lower-speed packet-switches (100) operating independently and in parallel, as sketched in FIG. 1. In each ingress port adapter, such as (110), an incoming flow of packets (120) is spread (130), packet-by-packet, by a load balancer across the slower packet-switches, then recombined by a multiplexor (140) in the egress part of each port adapter e.g., (150). As seen by an arriving packet, a PPS is a single-stage packet-switch that needs to have only a fraction of the performance necessary to sustain the port (125) data rate. If four planes (100) are used, as shown in FIG. 1, they need only to have one fourth of the performance that would otherwise be required to handle a full port data rate. More specifically, four independent switches, designed with OC192c ports, can be associated to offer OC768c port speed, provided that ingress and egress port adapters (110, 150) are able to load balance and recombine the packets. This approach is well known from the art and sometimes referred to as 'Inverse Multiplexing' or 'Load Balancing'. Among many publications on the subject one may e.g., refer to a paper published in Proc. ICC'92, 311.1.1-311.1.5, 1992, by T. ARAMAKI et al., untitled '*Parallel "ATOM" Switch Architecture for High-Speed ATM Networks*' which discusses the kind of architecture considered here.

The above scheme is also attractive because of its inherent capability to support redundancy. By placing more planes than what is strictly necessary it is possible to hot replace a defective plane without having to stop traffic. When a plane is detected as being or becoming defective ingress adapter load balancers can be instructed to skip the defective plane. When all the traffic from the defective plane has been drained out it can be removed and replaced by a new one and load balancers set back to their previous mode of operation.

Thus, if PPS is really attractive to support multi-Gbps channel speeds and more particularly OC768c switch ports it remains that this approach introduces the problem of packet resequencing in the egress adapter. Packets from an input port adapter (110) may possibly arrive out of sequence in a target egress adapter (150) because the various switching paths, here comprised of four planes (100), do not have the same transfer delay since they run independently thus, can have different buffering delays. A discussion and proposed solutions to this problem can be found, for example, in a paper by Y. C. JUNG et al., 'Analysis of out-of-sequence problem and preventive schemes in parallel switch architecture for high-speed ATM network', published in IEEE Proc.-Commun., Vol. 141, No. 1, February 1994. However, this paper does not consider the practical case where the switching planes have also to handle packets on a priority basis so as to support a Class of Service (CoS) mode of operation, a mandatory feature in all recent switches which are assumed to be capable of handling simultaneously all sorts of traffic at nodes of a single ubiquitous network handling carrier-class voice traffic as well as video distribution or just straight data file transfer. Hence, packets are processed differently by the switching planes depending on the priority tags they carry, and may incur very different transit delays depending on which switching plane they have been sent. As each ingress adapter makes its own decision on how it load balance the traffic among the different switching planes depending on the flow control information it receives, it may happen that not all switching planes are loaded in the same way, thus creating different delays for packets transmission over different switching planes. This does no longer comply with the simple FCFS (First-Come-First-Served) rule assumed by the above referenced paper and forces egress adapters to readout packets as soon as they are ready to be delivered by the switching planes after which they can be resequenced on a per priority basis taking in account the fact that packets coming from same source with same priority may have very different transit time when crossing the different switching planes.

Different mechanisms have been proposed to perform the resequencing of packets within a Parallel Packet Switch. However, all of them must face the difficulty that, due to the fact that switching planes may not be instantly identically loaded, in particular because of the multiple priorities in use, two packets sent in sequence by the same source on two different switching planes may incur very different transit delay until they reach the same egress adapter. Especially, low priority packets can easily be trapped in individual switching planes because higher priority packets take precedence. This clearly may create situations where a packet sent as second by a source, is received first in an egress adapter where it has to be kept in buffer, until first packet is finally received. Only then, a request can be posted to the egress scheduler, which must authorize successively both packets to leave the egress buffer on external interface.

In egress buffer, possibly many incomplete flows waiting for trapped packets may thus accumulate taking up space. Depending on the size of the buffer used to store packets in egress adapter, this may lead rapidly to an unacceptable congestion situation that would require discarding those of the packets already switched while missing ones are trapped in undetermined switching planes. Also, this may severely impact the end to end jitter, from ingress to egress line interface.

SUMMARY OF THE INVENTION

Thus, it is a broad object of the invention to overcome the difficulties mentioned here above in order to make feasible a PPS architecture in which variable delays can be experienced in the individual switching planes while supporting priority classes of unicast and multicast traffic in view of the implementation of a multi-Tbps switch.

It is another object of the invention to avoid egress buffer saturation and bound transit delays by providing an efficient and novel mechanism that allows identifying unambiguously which switching planes are responsible for the buffer saturation and to unstop the flow of data packets from them.

In an embodiment, the invention applies in a parallel packet switch architecture having at least one egress adapter arranged to temporarily store within an egress buffer data packets switched through a plurality of independent switching planes. Each data packet belongs to a data packet flow wherein the data packets are sequentially numbered with a packet sequence number. The invention claims a system for controlling the egress buffer saturation and which comprises for each data packet flow:

means for comparing the number of data packets 'WPC' temporarily stored within the egress buffer to a predefined threshold value 'WPCth';

means for storing the packet sequence number 'PSNr' of a last received in-sequence data packet, and each highest packet sequence number 'HPSNj' respectively received through the plurality of switching planes; and means coupled to the comparing means and to the storing means for determining at least one switching plane among the plurality of switching planes on which to unstop the flow of data packets by comparing the last received in-sequence packet sequence number 'PSNr' to each highest packet sequence number 'HPSNj' when the number of data packets 'WPC' exceeds the predefined threshold value 'WPCth'.

Further objects, features and advantages of the present invention will become apparent to the ones skilled in the art upon examination of the following description in reference to the accompanying drawings. It is intended that any additional advantages be incorporated herein.

BRIEF DESCRIPTION OF THE DRAWINGS

FIG. 3 illustrates an incomplete numbered sequence of data packets.

FIG. 4 details the unstop block diagram shown on FIG. 2.

DETAILED DESCRIPTION OF THE PREFERRED EMBODIMENT

Figure 1:
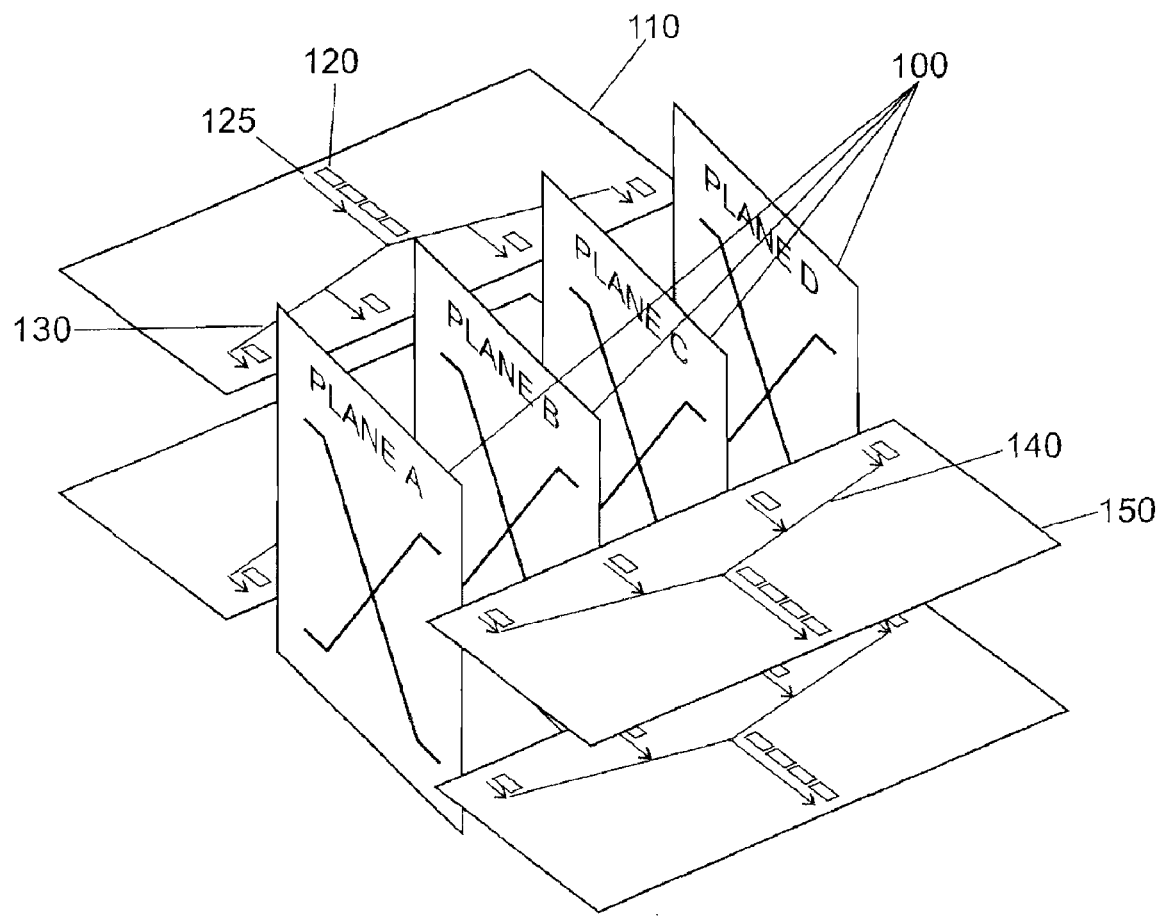
FIG. 1 shows a conceptual view of a parallel packet switch system to implement the invention.
Figure 2:
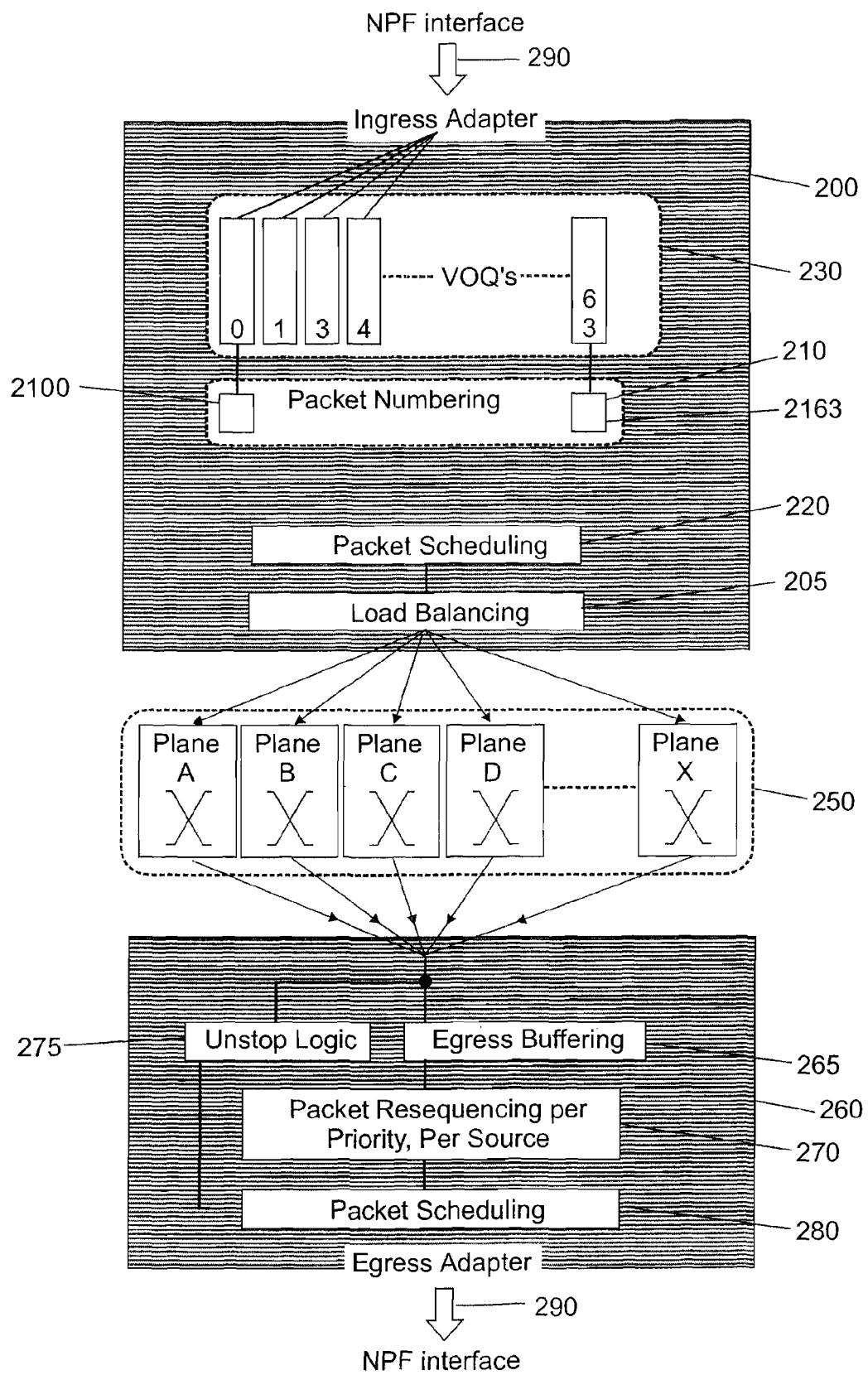
FIG. 2 is a block diagram showing the main components of a preferred embodiment of the invention.

FIG. 2 shows a functional view of a preferred PPS architecture including the invention. For sake of clarity, only one ingress adapter (200) is shown interfacing a plurality of switching planes (planes A to X under block 250) over which an incoming traffic arriving on ingress interface (290) is load balanced by a load balancer circuit (205). The skilled person will easily understand throughout the reading of the entire description that all functional principles are to be generalized to a plurality of ingress adapters.

All packets carry an identification of the source which has emitted them (i.e. an ingress adapter identifier among the many ones within the switch fabric)—together with a PSN (Packet Sequence Number). It is to be appreciated that there are as many PSN generators as there are possible destinations and priorities in one ingress adapter. PSN is e.g., incremented by 1 with each new packet destined for an output port at a given priority. One possible implementation is shown in block (210), which takes benefit of a Virtual Output Queuing (VOQ) organization (230), a common feature of modern packet switches, which avoids destination head of line blocking. VOQ is not part of the present invention and is not further described since it is a well-known technique by those skilled in the art. For each VOQ, there is an associated counting device (2100 to 2163) which generates a PSN. Counting devices may operate independently of each other, each one corresponding to a unique packet flow identified by its source, its destination, and its priority. Each VOQ feeds a packet scheduling function (220) in each ingress port-adapter, which selects the waiting incoming packets to be switched. On egress adapter, packets received through the various planes (250), are temporarily stored in an egress buffer (265). An unstop logic block (275) is coupled to the egress buffer and to a packet scheduler (280) to determine if a switching plane is to be unstopped. The unstop logic is arranged to have access to:

The PSN of the incoming packets from all switching planes, per source, per priority; and The PSN of the 'last ready packet for scheduling' (PSNr) by source and priority.

The 'last ready packet for scheduling' relates to the last packet for which a continuous sequence has been recovered by the packet resequencing function (270) and is thus available for scheduling (i.e. Ready for leaving the egress adapter). This will further detailed with reference to FIG. 3.

Whichever resequencing mechanism is used, each egress adapter is equipped with an output scheduler (280) whose role is to select, at each packet cycle, for transmission the next packet, temporarily stored in the egress buffer (265), due to leave the egress adapter. The ingress and egress packet scheduling are mechanisms beyond the scope of the invention and are not further discussed other than to mention that their role is normally to serve the waiting packets of highest priorities first while, for each priority, maintaining fairness between the sources of traffic. These are standard functions in switch port-adapters. Packet scheduling (220, 280) and VOQ's (230) are not part of the invention which does not require any specific behavior from these elements to operate as specified in the rest of the description.

FIG. 2 and following figures illustrate the invention on a preferred implementation assuming that the switch is a 64-port switch, thus with VOQ's having 64 destinations (0-63) per priority.

Generally, the switch port-adapters have a standard line or NP (network processor) IN and OUT interface (290) e.g., such as the ones defined by the Network Processing Forum (NPF), 39355 California Street, Suite 307, Fremont, Calif. 94538.

FIG. 3 shows an example of PSN's belonging to a same flow of packets i.e., packets from a same source, towards a same destination at a same priority, which have been switched over any switching planes A to X (250). Packets stamped with PSN's referenced N, N+1, N+2 (grouped under block 310) are in sequence and may be scheduled at any time to leave on egress interface (290). Packets stamped with PSN's referenced N+4, N+5, N+6 (grouped under block 320) are also in sequence but cannot be scheduled because the packet referenced N+3 has not been received yet. Similarly, packets stamped with PSN's from N+8 to N+11 (grouped under block 330) are in sequence but cannot be scheduled as long as packets N+3 and N+7 have not been received. A waiting packet counter (WPC) 340, counts all data packets stored in the egress buffer that belong to a same flow. This count is done irrespectively of the fact that packets are in sequence and thus can be scheduled over the egress interface line, or are blocked because there is one or more missing packets. In the present example, packet stamped with PSN equal to N+2 is the 'last received in sequence' packet.

As shown in FIG. 3, for the sake of simplicity, the invention is exemplified assuming that packets are numbered at source with an increasing complete sequence of numbers N, N+1, N+2, etc. However, the invention does not preclude the use of other methods like a decreasing sequence of numbers or any other ordered incomplete sequences of numbers. The only assumption that must hold is that egress adapter must be capable of determining, whichever numbering or ranking method is adopted, from the received PSN sequences, when packets are missing (as this is indeed the case above for missing packets n+3 and n+7). Also, it is to be appreciated that terms like 'highest' is to be interpreted in light of the numbering sequence used to illustrate the invention i.e., an ascending sequence. In this context 'highest' means also the latest numbered packet received in the egress adapter from one switching plane.

FIG. 4 shows the resources required, in an embodiment of the invention, by the unstop logic block (275) of FIG. 2. For each flow of data packets, characterized in an egress adapter by its source and priority, there is one set of memory devices e.g., registers (410), used to store:

The WPC as already discussed above (340) and which indicates the total number of packets stored in the egress buffer for this flow. Packets can be in sequence or not.

The PSNr, which holds the sequence number of the 'last received in sequence' packet as discussed in FIG. 3.

A set of 'Highest Packet Sequence Number' HPSN, one per switching plane. Six HPSN's are exemplified (HPSN1 to HPSN6) assuming that the Parallel Packet Switch structure is made, in this example, of six switching planes. Each HPSN's register remembers, per data flow, what is the highest packet sequence number received through the corresponding plane.

Figure 5:
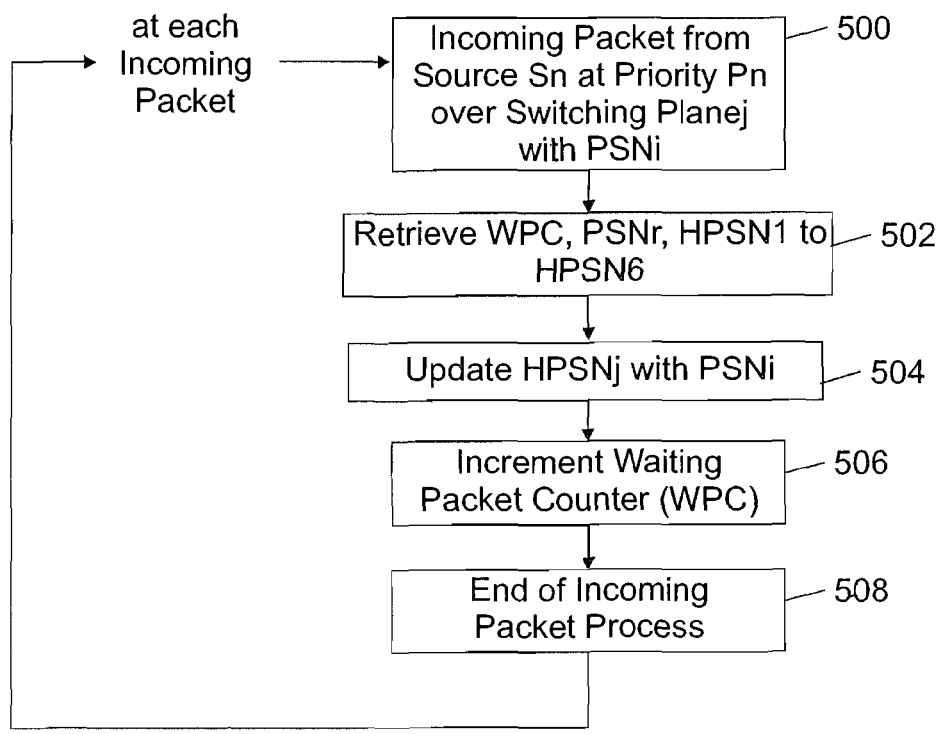
FIG. 5 is a flow chart of the incoming packet process in the egress adapter.

FIG. 5 describes the algorithm performed within the unstop logic function when a new packet is received by an egress adapter from any switching plane. To illustrate the invention the following description assumes there are six switching planes. It must be clear, however, that the invention can be practiced with any other number of switching planes.

Each new packet received from any switching plane j belongs to one flow, identified by its source Sn and priority Pn. Moreover, each incoming packet carries a PSN referred to as PSNi (box 500). The flow identification (by the source Sn and the priority Pn identifiers) allows retrieving (step 502) from the associated register (410) shown in FIG. 4 the current status of the flow as characterized by the number of waiting packets in egress buffer for this flow (WPC), the value of the 'last received in sequence' PSNt, and the values of the highest packet sequence numbers received over the six switching planes HPSN1 to HPSN6. Then, HPSNj value of switching plane j on which packet has just arrived is updated (step 504) with the packet sequence number of the received data packet. This rests on the assumption that switching planes never introduce (by design) any disordering in the delivery of packets thus, deliver packets from a same source at a same priority in the exact same order as received from an ingress adapter so that HPSNj is always higher than a previous received one. On next step 506, WPC is incremented. This ends the incoming packet process (508).

Figure 6:
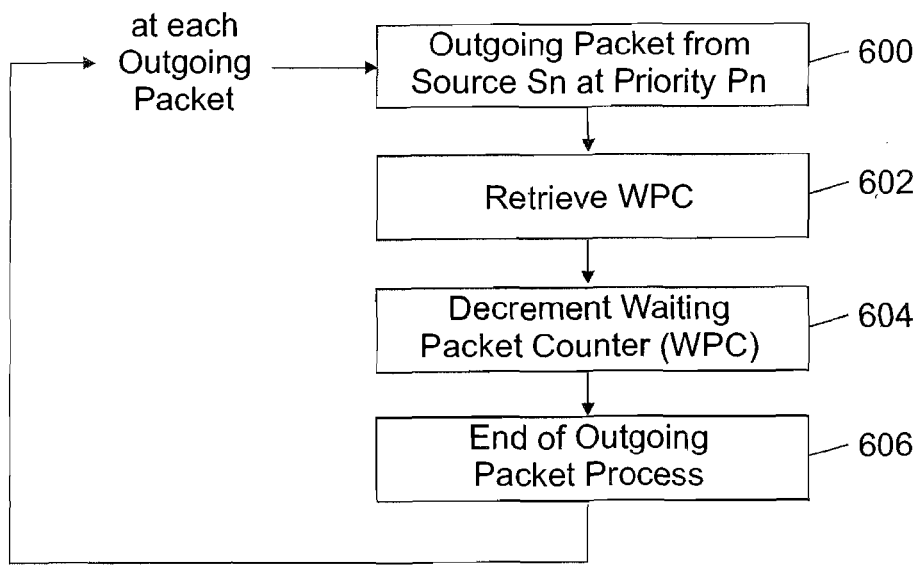
FIG. 6 is a flow chart of the outgoing packet process in the egress adapter.

FIG. 6 describes the operations performed when a packet leaves the egress adapter over the NPF interface (290). At each outgoing packet (box 600), the WPC of the flow to which the outgoing packet belongs and which is identified by Sn and Pn, is retrieved (step 602). Then, WPC is decremented by one (604) indicating that there is one packet less in the egress buffer for that flow. This ends the outgoing packet process (606).

Figure 7:
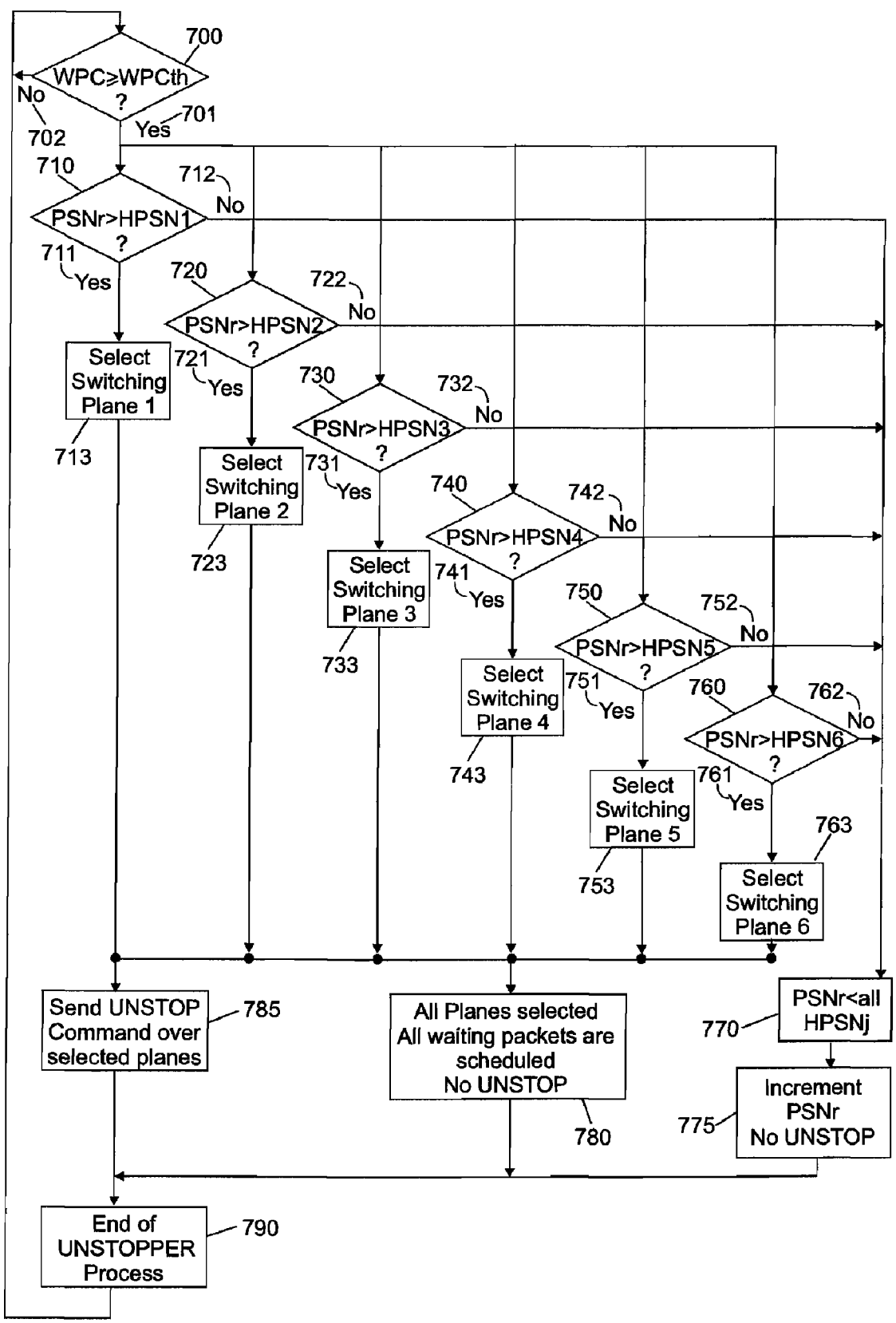
FIG. 7 is a flow chart of the process to determine the switching plane to be unstopped.

FIG. 7 describes the process to determine which switching plane(s) should be unstopped. For each flow, the current WPC is periodically compared to a threshold value WPCth (box 700). This threshold value is a fixed value, which depends on the size of the egress buffer, the number of switching planes, the number of priorities, and depends in general of the physical characteristics of a particular implementation. Then, when current waiting packet count is lower than WPCth (branch 702), no action is performed until next comparison. When the current waiting packet count WPC equals or is higher than WPCth (branch 701), then each HPSN value for switching planes 1 to 6 (HPSN1 to HPSN6), related to this flow, is retrieved from the corresponding memory device (410) and is compared to the PSN of 'last received in sequence' packet i.e., PSNr (boxes 710, 720, 730, 740, 750 and 760 respectively for switching planes 1 to 6).

Next, if for all switching planes, PSNr is equal to or lower than HPSNj i.e., HPSN1 to HPSN6 (branches 712, 722, 732, 742, 752 and 762 respectively), it means that on all switching planes, data packets have arrived with a packet sequence number higher than the last packet ready for scheduling. However, because PSNr has a lower value it can only mean that resequencing is stuck with PSNr, waiting for the next in sequence i.e., PSNr+1 (since numbering is assumed to be a complete ascending sequence in the example used to illustrate the invention), which packet has never arrived, while packets with PSN value higher than PSNr+1 have arrived on all switching planes (box 770). Although switching planes are normally loss less, it may seldom happen that packets are lost between ingress adapter and egress adapter. Reasons may be transmission error, possibly leading to a corrupted packet. Depending on the level of protection within the system, which is beyond the scope of the present invention, the corrupted packet may be discarded or misrouted, this action leading to the above mentioned blocking in the resequencing mechanism. In such a case, there is nothing else to do than to unblock the resequencing algorithm by incrementing to the next number in sequence (e.g., by +1) the current value of PSNr (box 775). No unstop action is performed and there is no further processing (box 790) other than, as an option, reporting to the device in charge that a packet was lost.

If PSNr is higher than HPSNj in all the switching planes, i.e., HPSN1 to HPSN6 (branches 711, 721, 731, 741, 751 and 761 respectively), all planes are selected (boxes 713, 723, 733, 743, 753 and 763). This means that, on none of the switching planes a packet has arrived with a PSN higher than the last packet ready for scheduling. PSNr has the highest value. Hence, it can only mean that resequencing has gone until last received value PSNr. Then, all packets as counted in WPC, can be scheduled. For reasons that are beyond the scope of present invention, these waiting packets have not been forwarded on egress interface and have accumulated above WPCth. What to do in this case is highly dependent on the design and system implementation choices of the switching node where the invention is used. No unstop action (box 780) needs to be performed and there is no further process (790) other than, possibly, reporting to the device in charge that packets, yet in sequence, are accumulating.

If for at least one switching plane, but not all of them, PSNr is higher than HPSNj i.e., HPSN1 to HPSN6 (as previously, branches 711, 721, 731, 741, 751 and 761 respectively), then corresponding switching planes are selected (713 to 763 respectively). For those of the switching planes that are selected (box 713, 723, 733, 743, 753 and 763) means that no packet has arrived with a packet sequence number higher than the last packet ready for scheduling, while on the non selected ones (there is at least one), packet(s) have arrived with a higher sequence number higher. Then, it means that resequencing is stuck because packets are expected on those selected switching planes. Typically, this may be caused by low priority packets being blocked by higher priority packets inside selected switching planes. In which case, unstop process is to be triggered on the selected switching planes (box 785), which will eventually unblock the resequencing mechanism. There is no further process (box 790).

In the context of the invention unstop a switching plane means "doing what is necessary" for the switching plane identified (as the one to be unstopped) to send out the missing packet. Typically, the missing packet is not sent out because it is of a lower priority than other packets which take precedence over it. The invention set forth mechanism and method to determine which switch plane to unstop. The invention does not describe what needs to be done on the identified switch plane, as this is highly dependent on type and internal structure of switch plane. For example, one possible method is to apply priority elevation to those lower priority packets destined to the destination adapter, blocked by higher packets going to that same adapter.

The unstop process will not be further described as it is application specific and may be implemented by those skilled in the art in many different ways depending on system characteristics. The mechanism described above allows determining, without ambiguity, which switching plane(s) have caused the resequencing issue for the related flow. The unstop process provides a means to trigger, in switching planes, the retrieving and forwarding of packets to an egress adapter. The retrieving process itself is highly dependent on the design of the switching planes and is beyond the scope of the invention. This process is implementation dependent. It may or not have an impact on delay and jitter of other packets not belonging to the related flow and being switched over the identified switching plane.

In the context of the invention computer readable medium means an object, such as a disc, memories, tape, DVD, or similar devices, carrying information that is read by a computer. Such objects are well known in computer technology and further description is not warranted.

Figure 8:
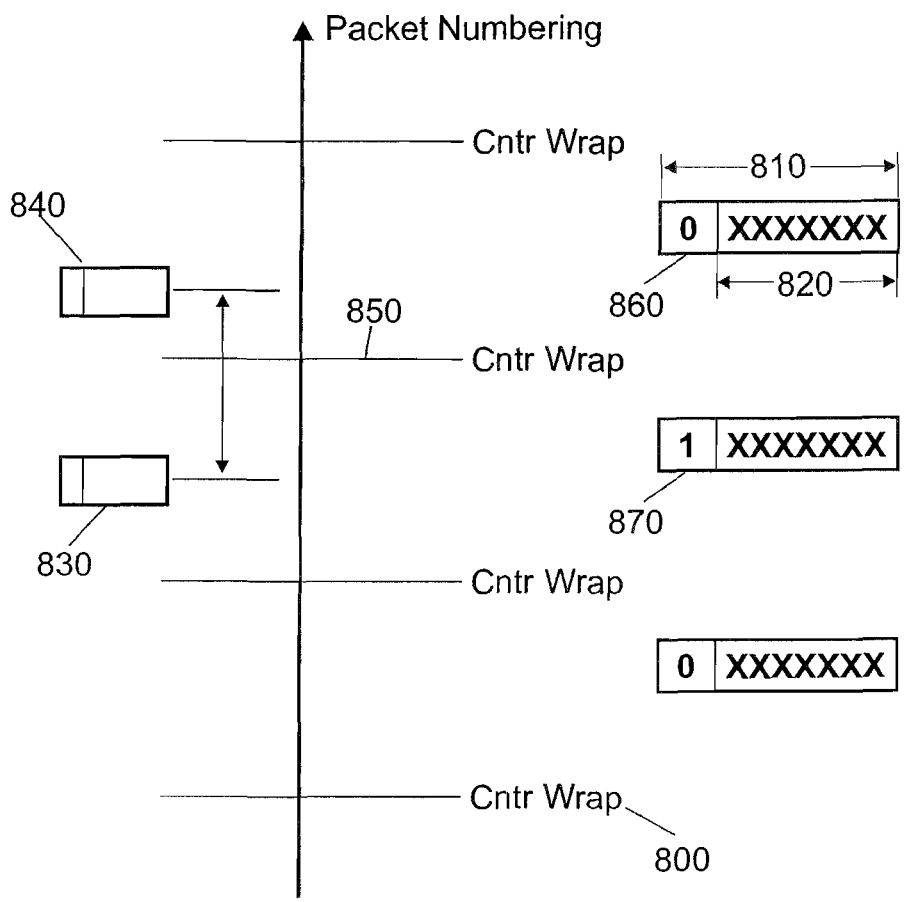
FIG. 8 is a schematic view to illustrate the wrapping of the source counters.

FIG. 8 briefly discusses the problem of the wrapping (800) of the counters used to rank packets at ingress or at egress. Those counters have a finite length thus, whatever their counting capacity the problem of their wrapping must be solved. The invention assumes that those counters have one bit more (810) than what is necessary to number the packets. For a given application the counting capacity (820) must be determined so that the oldest numbered packet still waiting in the egress buffer (830) cannot be wrongly compared with a new arriving packet (of the same source with the same priority) because the counter used in the source has wrapped in the mean time. Once this value has been determined the invention assumes that the counters are all made one bit wider so that numbering of waiting packets cannot span on more than one counter wrapping boundary (850). Then, it is easy to take care of the counter wrapping. One solution consists in detecting the first occurrence of a readout packet number for which MSB (most significant bit) is found to be 0 (860) after a series of ones, in which case comparison of MSB's must be toggled.

While the invention has been particularly shown and described with references to an embodiment, it will be understood by those skilled in the art that various changes in both form and detail may be made therein without departing from the scope and spirit of the invention.

Having thus described our invention, what we claim is as follows:

1. A system comprising:
   a plurality of switching planes; and
   at least one egress adapter comprising:
      a buffer for temporarily storing a number of data packets;
      a register for storing a packet sequence number of a last received in-sequence data packet and for storing each highest packet sequence number respectively received through the plurality of switching planes; and
      an unstop logic block coupled to the buffer and to the register for determining at least one switching plane among the plurality of switching planes on which to unstop a flow of data packets by comparing the packet sequence number of the last received in-sequence data packet to each highest packet sequence number when the number of data packets exceeds a predefined threshold value.

2. The system of claim 1, further comprising at least one ingress adapter coupled to the plurality of switching planes, wherein the at least one ingress adapter sequentially numbers the data packets within the flow and identifies each data packet within the flow by an ingress adapter identifier and a priority level identifier.

3. The system of claim 2, wherein the unstop logic block identifies the register using the ingress adapter identifier and the priority level identifier of the flow.

4. The system of claim 2, wherein the at least one ingress adapter further comprises a load balancer circuit for load balancing the data packets within the flow among the plurality of switching planes.

5. The system of claim 1, wherein the at least one egress adapter further comprises a packet resequencer for resequencing the data packets temporarily stored within the buffer for the flow.

6. The system of claim 5, wherein the at least one egress adapter further comprises a packet scheduler for outputting resequenced data packets from the buffer.

7. The system of claim 1, wherein the at least one egress adapter further comprises a counter for counting the number of data packets temporarily stored within the buffer for the flow.

8. The system of claim 7, wherein the counter decrements the number of data packets temporarily stored within the buffer when a resequenced data packet is output from the buffer.

9. The system of claim 1, wherein each of the number of data packets is sequentially numbered with a packet sequence number.

10. A program product comprising a non-transitory computer readable medium on which a computer program is embedded, the computer program comprising:
    a first module of computer instructions for examining data packets in a flow and for recording a packet sequence number of a last received in-sequence data packet;
    a second module of computer instructions for examining data packets received through a plurality of switching planes and for recording a highest sequence number for data packets received through each of the plurality of switching planes; and
    a third module of computer instructions for identifying at least one switching plane to unstop by using the packet sequence number of the last received in-sequence data packet and the highest sequence number for each of the plurality of switching planes.

11. The program product of claim 10, further comprising a fourth module of computer instructions for determining a number of data packets in a buffer associated with the flow and for comparing the determined number of data packets with a threshold value.

12. The system of claim 1, wherein the at least one switching plane so determined releases an in-sequence data packet whose packet sequence number is next to the packet sequence number of the last received in-sequence data packet.

* * * * *